(12) United States Patent
Minnichsoffer et al.

(10) Patent No.: US 10,119,450 B2
(45) Date of Patent: Nov. 6, 2018

(54) OXYGEN SENSOR COOLING DUCT

(71) Applicant: Arctic Cat, Inc., St. Cloud, MN (US)

(72) Inventors: Wayne L. Minnichsoffer, Thief River Falls, MN (US); Jeremy B. Parsons, Thief River Falls, MN (US)

(73) Assignee: Arctic Cat, Inc., Minneapolis, MN (US)

(*) Notice: Subject to any disclaimer, the term of this patent is extended or adjusted under 35 U.S.C. 154(b) by 0 days.

(21) Appl. No.: 15/873,791

(22) Filed: Jan. 17, 2018

(65) Prior Publication Data

US 2018/0142603 A1 May 24, 2018

Related U.S. Application Data

(63) Continuation of application No. 15/418,630, filed on Jan. 27, 2017, now Pat. No. 9,909,483, which is a (Continued)

(51) Int. Cl.
*F01N 13/10* (2010.01)
*B60K 13/04* (2006.01)
(Continued)

(52) U.S. Cl.
CPC ............. *F01N 13/10* (2013.01); *B60K 13/04* (2013.01); *F01N 11/00* (2013.01); *F01N 11/007* (2013.01);
(Continued)

(58) Field of Classification Search
CPC ........ F01N 13/10; F01N 11/007; B60K 13/04
See application file for complete search history.

(56) References Cited

U.S. PATENT DOCUMENTS 3,969,932 A * 7/1976 Rieger .............. F01N 11/007
60/277
4,061,117 A * 12/1977 Ikeura .............. F02D 41/1494
123/41.31
(Continued)

FOREIGN PATENT DOCUMENTS

JP 2000234548 A 8/2000
JP 2001303951 A 10/2001
(Continued)

*Primary Examiner* — Erez Gurari
(74) *Attorney, Agent, or Firm* — Lowe Graham Jones PLLC

(57) ABSTRACT

Methods, systems, and vehicles that control the temperature of a device included in the vehicle are presented herein. The temperature of the device is controlled by ventilating the device with drivetrain air, such as transmission cooling air. In some embodiments, the device is at a greater temperature than the drivetrain air, which cools the device. In other embodiments, the device is at a lesser temperature than the drivetrain air, which heats the device. The drivetrain air is provided to the device through an exhaust duct coupled to the vehicle's transmission. The drivetrain exhaust air is preferably circulated by the transmission. The transmission may be a continuously variable transmission. The device may be an oxygen sensor that is coupled to an engine exhaust pipe. The oxygen sensor is thermally coupled to the engine exhaust and the engine exhaust pipe, which are at greater temperatures than the transmission exhaust air.

15 Claims, 14 Drawing Sheets

Related U.S. Application Data continuation of application No. 14/475,359, filed on Sep. 2, 2014, now Pat. No. 9,587,548.

(51) Int. Cl.
| | | |
|---|---|---|
| *F01N 11/00* | (2006.01) | |
| *F01N 13/00* | (2010.01) | |
| *F16H 57/035* | (2012.01) | |
| *F16H 57/04* | (2010.01) | |
| *F16H 9/14* | (2006.01) | |
| *F16H 55/56* | (2006.01) | |
| *F16H 57/027* | (2012.01) | |

(52) U.S. Cl.
CPC .......... *F01N 13/008* (2013.01); *F16H 9/14* (2013.01); *F16H 55/56* (2013.01); *F16H 57/027* (2013.01); *F16H 57/035* (2013.01); *F16H 57/0416* (2013.01); *F16H 57/0489* (2013.01); *F01N 2260/02* (2013.01); *F01N 2260/022* (2013.01); *F01N 2560/025* (2013.01); *F01N 2560/20* (2013.01); *F01N 2590/04* (2013.01)

(56) References Cited

U.S. PATENT DOCUMENTS

| | | | | |
|---|---|---|---|---|
| 4,078,379 | A * | 3/1978 | Minami | F02D 35/00 123/701 |
| 4,186,694 | A * | 2/1980 | Koseki | F01N 3/05 123/41.31 |
| 4,779,577 | A * | 10/1988 | Ritter | F01P 7/02 123/41.05 |
| 5,325,663 | A * | 7/1994 | Itoh | F01N 3/22 60/274 |
| 5,333,446 | A * | 8/1994 | Itoh | F01N 3/22 60/274 |
| 5,640,847 | A * | 6/1997 | Nakajima | F01N 11/007 60/276 |
| 5,806,306 | A * | 9/1998 | Okamoto | F01N 11/007 60/277 |
| 6,077,135 | A * | 6/2000 | Ito | B63B 13/00 114/55.5 |
| 6,253,547 | B1 * | 7/2001 | Watanabe | B01D 53/9495 60/274 |
| 6,324,893 | B1 * | 12/2001 | Watanabe | F01N 3/0814 73/23.32 |
| 8,365,519 | B2 * | 2/2013 | Wirbeleit | F01N 3/046 60/304 |
| 2003/0131587 | A1 * | 7/2003 | Kawamura | F01N 11/00 60/276 |
| 2008/0209886 | A1 | 9/2008 | Zillmer et al. | |
| 2010/0155170 | A1 | 6/2010 | Melvin et al. | |
| 2010/0187032 | A1 | 7/2010 | Yamamura et al. | |
| 2012/0191306 | A1 | 7/2012 | Baldwin et al. | |
| 2013/0291523 | A1 | 11/2013 | Shah et al. | |
| 2014/0230799 | A1 | 8/2014 | Parikh et al. | |
| 2014/0238185 | A1 * | 8/2014 | Kii | F16H 57/0489 74/606 A |
| 2016/0061088 | A1 * | 3/2016 | Minnichsoffer | F01N 13/008 180/309 |
| 2017/0138247 | A1 * | 5/2017 | Minnichsoffer | F01N 13/008 |

FOREIGN PATENT DOCUMENTS

| | | |
|---|---|---|
| JP | 2012127202 A | 7/2012 |
| KR | 20130017974 A | 2/2013 |

\* cited by examiner

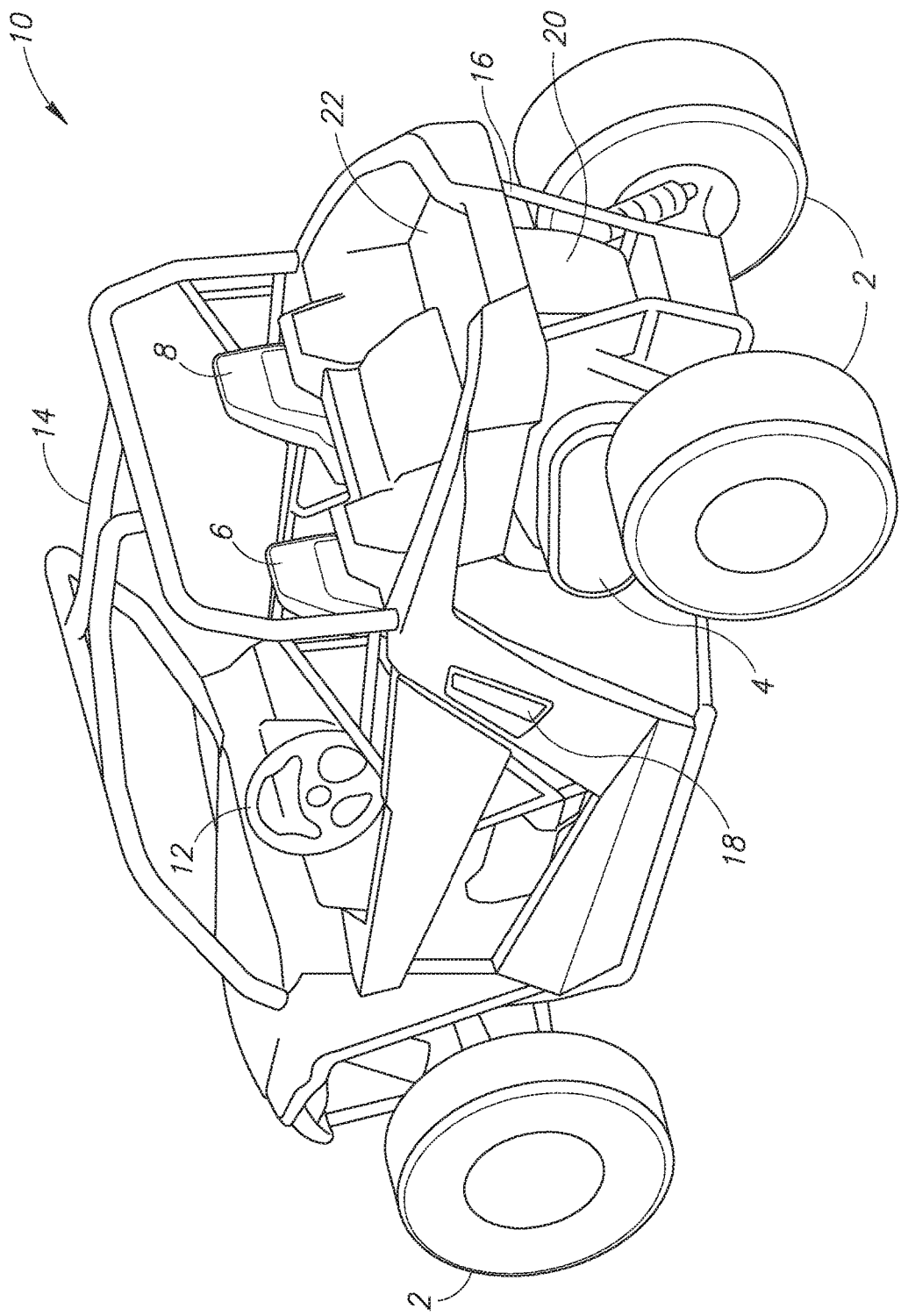

OXYGEN SENSOR COOLING DUCT

PRIORITY CLAIM

This patent application is a Continuation of U.S. patent application Ser. No. 15/418,630, entitled OXYGEN SENSOR COOLING DUCT, filed on Jan. 27, 2017, which is a Continuation of U.S. patent application Ser. No. 14/475,359, entitled OXYGEN SENSOR COOLING DUCT, filed on Sep. 2, 2014, and issued as U.S. Pat. No. 9,587,548 on Mar. 7, 2017. All contents of which are hereby incorporated by reference.

TECHNICAL FIELD OF THE INVENTION

The disclosure relates generally to controlling the temperature of vehicle components and specifically to controlling the temperature of vehicle components by ventilating the components with clutch case exhaust air.

BACKGROUND OF THE INVENTION

Modern vehicles include numerous temperature sensitive devices, such as sensors, switches, microcontrollers, memory devices, communication transceivers, and the like. These devices often include a temperature specification. If operated or exposed to temperatures outside of the temperature specification, the device may not operate or perform reliably. In some cases, the device may even be subject to a shortened lifespan.

Modern vehicles also include "hot spots" due to heat sources, such as internal combustion engines and engine exhaust systems. Some of the above devices may be required to be positioned close enough to a "hot spot" to be heated close to or beyond the upper bound of the device's temperature specification.

For example, oxygen sensors are employed in many vehicles to monitor the oxygen content of the vehicle's engine exhaust. In order to monitor this oxygen content, the oxygen sensor must sample and be exposed to the vehicle's exhaust. The sensor casing may be mounted directly to the exhaust pipe. The engine exhaust and pipe may be at a greater temperature than the upper bound of the oxygen sensor's temperature specification.

Furthermore, some vehicles are operated in cold climates where the ambient air temperature is less than the lower bound of the temperature specification of various devices. It is for these and other concerns that e following disclosure is offered.

SUMMARY OF THE INVENTION

The present disclosure is directed towards systems, vehicles, and methods for controlling the temperature of temperature sensitive devices or components employed in vehicles. The temperature sensitive device may be either heated or cooled by providing ventilation, where the source of the ventilating air or gas is the vehicle's drivetrain.

A system for cooling a device included in a vehicle includes a drivetrain duct that includes a first aperture and a second aperture. The first aperture is coupled to a drivetrain aperture included in a drivetrain of the vehicle. The system may also include a coupler that is configured and arranged to couple the first aperture to a drivetrain aperture included in a drivetrain of a vehicle such that the second aperture is directed at the device. In at least one embodiment, the second aperture is positioned at a predetermined distance from the device. The device is thermally coupled to a heat source included in the vehicle.

When the drivetrain is engaged, the heat source is at a first temperature and the drivetrain outputs drivetrain exhaust gas through the drivetrain aperture. The drivetrain exhaust gas is at a second temperature and at a drivetrain pressure. In some embodiments, the device is under an ambient pressure. The first temperature may be greater than the second temperature. In some embodiments, the drivetrain pressure is greater than the ambient pressure.

In some embodiments, the device is an oxygen sensor. The drivetrain aperture may be a transmission aperture. The transmission may be a continuously variable transmission. The heat source includes power source exhaust gas generated by the vehicle's power source. In at least one embodiment, the heat source includes a power source exhaust duct coupled to the vehicle's power source. In a preferred embodiment, the drivetrain includes a plurality of rotating fins and/or blades. The plurality of rotating fins and/or blades circulates at least a portion of the drivetrain exhaust through the drivetrain aperture.

The drivetrain duct is configured and arranged to be coupled to the vehicle's frame when the first aperture is coupled to the drivetrain aperture. The device may be a sensor, a switch, or a voltage regulator.

The predetermined distance may be based on a difference between the first temperature of the heat source and the second temperature of the drivetrain exhaust gas when the drivetrain is engaged. Furthermore, the predetermined distance may be based on a difference between the ambient pressure that the device is under and the drivetrain pressure of the drivetrain exhaust gas when the drivetrain is engaged.

When the drivetrain is engaged, the first temperature of the heat source is between 800° C. and 900° C. This may be the exhaust gas temperature inside a power source exhaust pipe or duct. The second temperature of the drivetrain exhaust gas is between 200° C. and 300° C. A backpressure generated by the drivetrain duct when the drivetrain is engaged is substantially less than a difference between the ambient pressure that the device is under and the drivetrain pressure of the drivetrain exhaust gas.

A cross section of the drivetrain duct may be based on at least a difference between the ambient pressure that the device is under and the drivetrain pressure of the drivetrain exhaust gas when the drivetrain is engaged. In at least one embodiment, the system further includes a manifold configured and arranged to position a third aperture of the drivetrain duct at a second predetermined distance from another device when the first aperture is coupled to the drivetrain aperture.

A vehicle consistent with the various embodiments includes a frame, a plurality of ground engaging members coupled to the frame, and a power source configured and arranged to convert stored energy into mechanical work. The vehicle also includes a drivetrain configured and arranged to transmit the mechanical work provided by the power source to at least one of the plurality of ground engaging members. The drivetrain includes a first exhaust source that when the drivetrain is engaged produces a first exhaust gas at a first temperature. The first exhaust gas may be at a first pressure.

The vehicle also includes a heat source such that when the vehicle is operated, the heat source is at a second temperature that is greater than the first temperature. Further, the vehicle includes a temperature sensitive device that is thermally coupled to the heat source and under an ambient pressure that is less than the first pressure. In at least one embodiment, the vehicle includes a conduit configured and arranged to provide at least a portion of the first exhaust gas to the device.

A system for controlling the temperature of a device included in a vehicle includes a drivetrain duct that includes a first aperture and a second aperture. The first aperture is coupled to a drivetrain aperture included in a drivetrain of the vehicle. The system may also include a coupler that is configured and arranged to couple the first aperture to the drivetrain aperture included in the drivetrain of the vehicle such that the second aperture is positioned at a predetermined distance from the device.

When the drivetrain is engaged, the device is at a first temperature. The device may be at a first pressure. The drivetrain outputs drivetrain exhaust gas through the drivetrain aperture. The drivetrain exhaust gas is at a second temperature. The drivetrain exhaust may be at a second pressure. The first temperature is different from the second temperature. The second pressure may be greater than the first pressure. In at least one embodiment, the first temperature is less than the second temperature. In another embodiment, the first temperature is greater than the second temperature.

BRIEF DESCRIPTION OF THE DRAWINGS

Preferred and alternative examples of the present invention are described in detail below with reference to the following drawings:

FIG. 1A illustrates an isometric view of an embodiment of a vehicle that is consistent with the various embodiments disclosed herein.

DETAILED DESCRIPTION OF THE PREFERRED EMBODIMENT

Figure 1B:
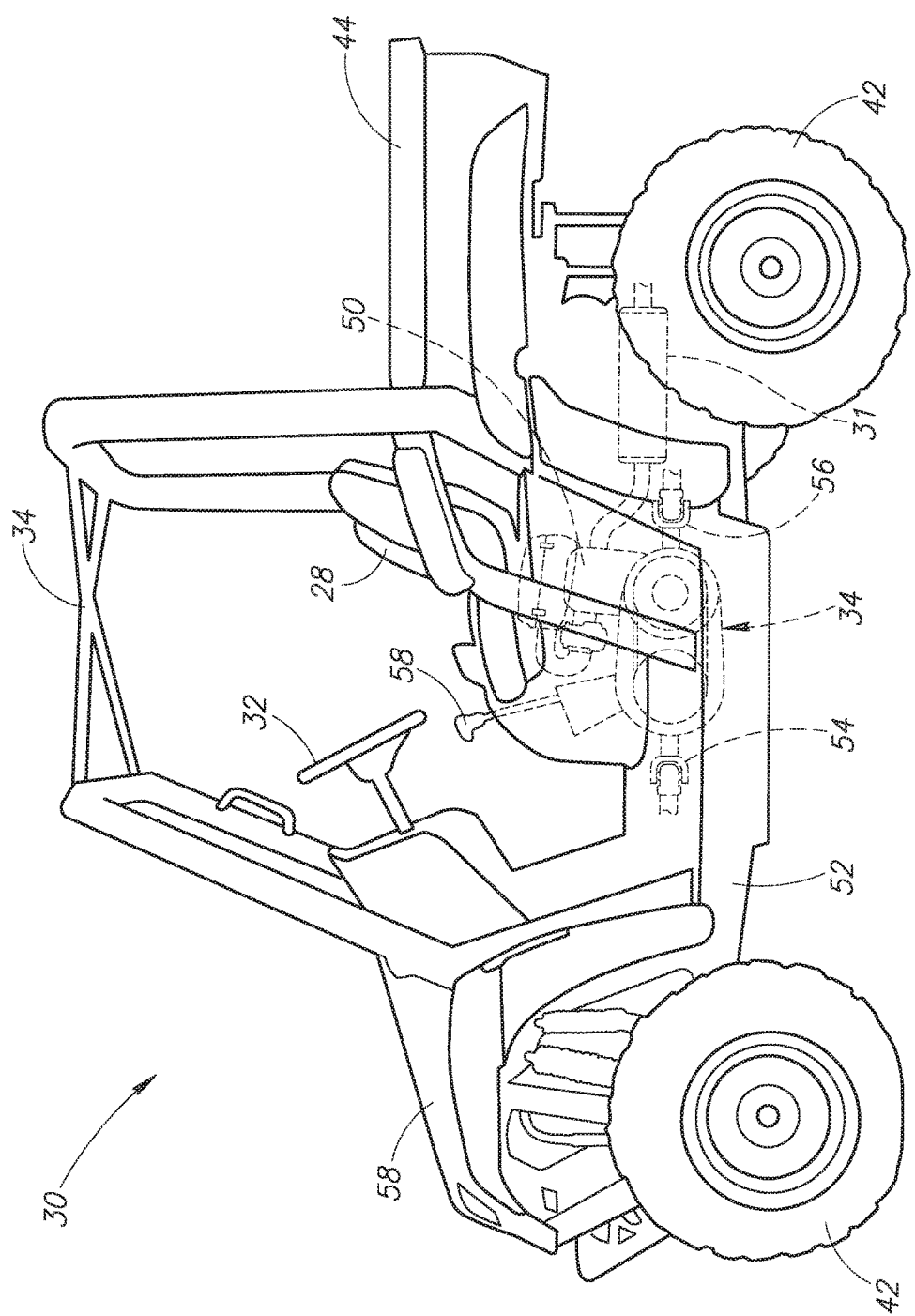
FIG. 1B illustrates a side view of another embodiment of a vehicle that is consistent with the various embodiments disclosed herein.

To facilitate the understanding of this invention, a number of terms are defined below. Terms defined herein have meanings as commonly understood by a person of ordinary skill in the areas relevant to the present invention. Terms such as "a," "an," and "the" are not intended to refer to only a singular entity, but include the general class of which a specific example may be used for illustration. The terminology herein is used to describe specific embodiments of the invention, but their usage does not delimit the invention, except as outlined in the claims.

FIG. 1A illustrates an isometric view of a vehicle 10 that is consistent with embodiments disclosed herein. In some embodiments, vehicle 10 is an off-road sport or utility vehicle. Vehicle 10 includes frame 16. Vehicle 10 includes a plurality of ground-engaging members 2 coupled to and supported by frame 16. In some embodiments, ground-engaging members 2 are wheels.

Vehicle 10 may include an operator's seat 6. In at least one embodiment, vehicle 10 includes a passenger seat 8. Vehicle 10 may include one or more control mechanisms, such as a steering mechanism 12, to control vehicle 10. In various embodiments, vehicle 10 includes a utility bed 22. Vehicle 10 includes roll-cage 14 to protect at least the operator in the event of a vehicle rollover. Roll-cage 14 may be coupled to frame 16 by employing at least one tube-coupler.

In some embodiments, vehicle 10 includes a powertrain that includes a power source and a drivetrain. A power source may include an engine, such as an internal combustion engine, a motor, such as an electric motor, a hybrid engine-motor, or any other device that is configured and arranged to convert stored energy into mechanical work, such as translation or rotation. In a preferred embodiment, the stored energy is stored in the chemical bonds of hydrocarbon molecules. The power source outputs the mechanical work, or power, and makes it available to the drivetrain. The drivetrain is configured and arranged to transmit the power to at least one of the ground engaging members 2. In at least one embodiment, the powertrain includes transmission 4. In some embodiments, transmission 4 is a continuously variable transmission (CVT).

Vehicle 10 includes one or more air intakes 18. Air intake 18 provides ambient air to airbox 20 and transmission 4. Furthermore, to insure proper operation of the power source, airbox 20 provides a portion of the ambient air from air intake 18 to the power source. In some embodiments, inefficiencies, such as internal friction, cause the transmission 4 to operate at a temperature greater than the ambient temperature. Ambient air provided to transmission 4 by air intake 18 at least partially cools transmission 4 through advection Because this thermodynamic exchange occurs in the fixed volume of the transmission housing, the heated gas is under a pressure that is greater than the ambient pressure.

As discussed in detail in the context of FIGS. 3A-3F, the operation of transmission 4 induces the venting, circulation, or flow, of this somewhat heated drivetrain cooling air, or simply drivetrain exhaust, through a drivetrain exhaust port. In at least one embodiment, the drivetrain exhaust is transmission exhaust. The drivetrain exhaust port may be a transmission port, such as a CVT air exhaust port.

In some embodiments, the conversion of stored energy into mechanical work results in a power source exhaust gas, such as exhaust gas from an internal combustion engine. Due to inefficiencies in the power source's energy conversion process, the power source exhaust gas, or simply the exhaust, may be at a greater temperature and/or pressure than the ambient air. In a preferred embodiment, the temperature of the power source exhaust is greater than the temperature of the drivetrain exhaust. The pressure of the power source exhaust may be greater than the pressure of the drivetrain exhaust. In a preferred embodiment, the power source exhaust is engine exhaust.

As with the transmission exhaust, the pressure differential between the power source exhaust and the ambient air induces the flow of the heated power source exhaust through a power source exhaust port. In a preferred embodiment, the power source exhaust port is coupled to a power source exhaust duct, such as an exhaust pipe. In at Least one embodiment, a power source exhaust duct delivers at least a portion of the power source exhaust to at east one of a muffler or catalytic convertor prior to the power source exhaust being vented to the external atmosphere.

FIG. 1B illustrates a side view of another embodiment of a vehicle 30 that is consistent with the various embodiments disclosed herein. Some features of vehicle 30 may be somewhat or substantially similar, analogous to, or a counterpart of features included in vehicle 10 of FIG. 1A. Other features of vehicle 30 may be somewhat or substantially dissimilar, different, alternative to, or not included in vehicle 10. Likewise, vehicle 10 may include features that are alternative to or have no analog and/or counterpart vehicle 30. Both vehicle 10 of FIG. 1A and vehicle 30 of FIG. 1B are consistent with embodiments disclosed herein. Vehicle 10 and vehicle 30 are exemplary vehicles only and the embodiments disclosed herein are not constrained by these exemplary vehicles.

Vehicle 30 includes a frame 52. Vehicle 30 includes a plurality of wheels 42 coupled to and supported by frame 52. Vehicle 30 includes at least one seating structure 28. Vehicle 30 includes a steering wheel 32 to control vehicle 30. Vehicle 30 includes roll-cage 34 to protect one or more occupants of vehicle 30. Vehicle 30 includes a hood 58 and a utility bed 44. In at least one embodiment, hood 58 conceals a storage space.

Vehicle 30 includes a power source, such as internal combustion engine 50. Engine 50 exhaust gas may pass through muffler 31 prior to being emitted into the atmosphere. Engine 50 is coupled to a transmission 34. A rear drive shaft 56 may couple the rear wheels 42 to transmission 34. A front drive shaft 54 may couple the front wheels 42 to transmission 34. A shift lever 58 is coupled to transmission 34.

Figure 1C:
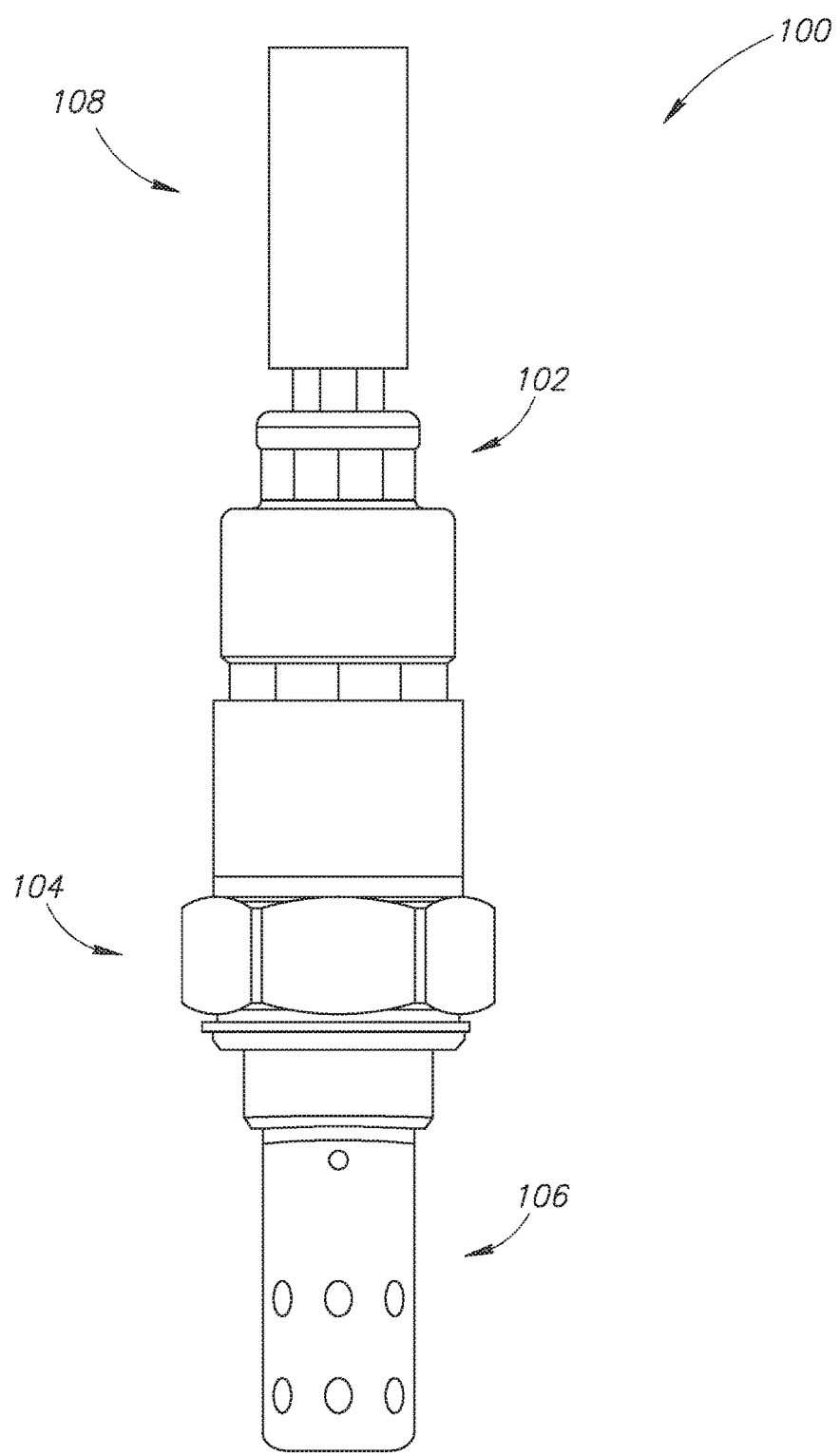
FIG. 1C illustrates an oxygen sensor device configured and arranged to provide data for real time monitoring of the oxygen content in the power source exhaust gas of a vehicle that is consistent with the various embodiments disclosed herein.

FIG. 1C illustrates an oxygen sensor device 100 configured and arranged to provide data for real time monitoring of the oxygen content in the power source exhaust gas of a vehicle, such as vehicle 10 of FIG. 1A or alternative vehicle 30 of FIG. 1B, that is consistent with the various embodiments disclosed herein. In at leak one embodiment, this data is employed to provide real time monitoring of an air-to-fuel ratio in a power source of the vehicle.

Oxygen sensor 100 includes a grommet portion 102, a hex portion 104, and a sensing element/heater portion 106. The hex portion 104 may include a fastener, such as a threaded hex-nut, to couple oxygen sensor 100 to the vehicle. The sensing element/heater portion 106 is exposed to and samples the vehicle's power source exhaust. Oxygen sensor 100 includes cabling 108. Cabling 108 is coupled to oxygen sensor 100 proximate the grommet portion 102. Cabling 108 provides electrical power to the oxygen sensor 100 and is enabled as an input/output (I/O) bus to enable communication with other devices, including outputting the real time oxygen data.

In some embodiments, to ensure the fidelity of the oxygen data and the expected lifetime of oxygen sensor 100, oxygen sensor 100 must be operated within a finite temperature range. In a preferred embodiment, the finite temperature range for sensing element portion 106 is between 600° C. and 950° C. The hex portion 104 must be operated at a temperature less than or equal to 650° C. Likewise, the grommet portion 102 must be operated at a temperature less than 260° C. If oxygen sensor 100 is operated continuously, these maximum values may be lower.

Figure 2:
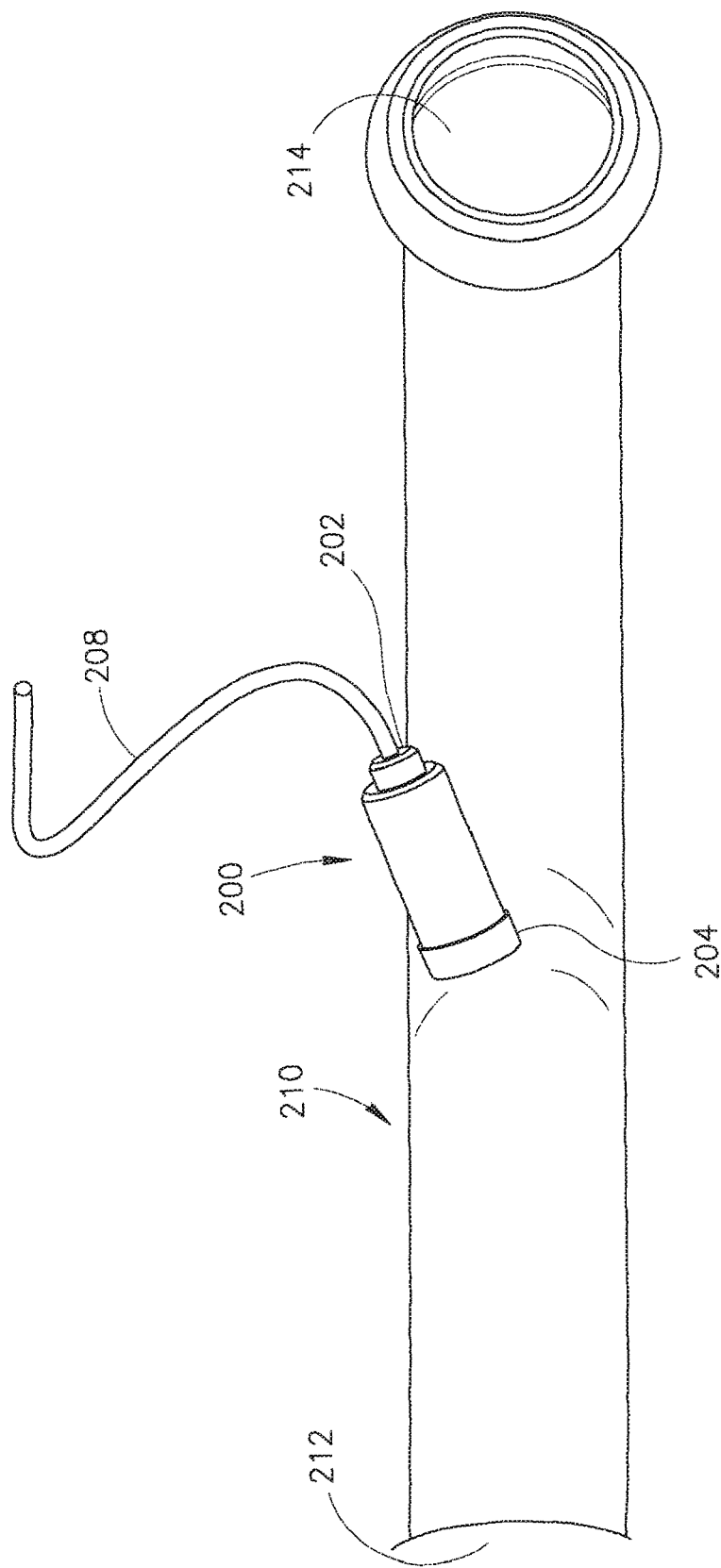
FIG. 2 illustrates a device, such as the oxygen sensor of FIG. 1C, coupled to a power source exhaust duct of a vehicle, such as the vehicle of FIG. 1A or the alternative vehicle of FIG. 1B, that is consistent with various embodiments disclosed herein.

FIG. 2 illustrates a device, such as the oxygen sensor 100 of FIG. 1C, coupled to a power source exhaust duct of a vehicle, such as the vehicle 10 of FIG. 1A or alternative vehicle 30 of FIG. 1B, that is consistent with various embodiments disclosed herein.

Exhaust from the power source enters power source exhaust duct 210 through power source exhaust duct input aperture 212. The heated power source exhaust exits power source exhaust duct 210 through power source exhaust duct output aperture 214.

Oxygen sensor 200 is coupled to power source exhaust duct 210. In order to sample the oxygen content of the power source exhaust, sensing element (not shown) of oxygen sensor 200 is exposed to power source exhaust through a sensor aperture in power source exhaust duct 210. In a preferred embodiment, the sensing element protrudes into and is substantially transverse to at least a portion of the lateral cross section of power source exhaust duct 210. Oxygen sensor 200 may be securely coupled to the power source exhaust duct 210 at the hex portion 204 by a fastener. The fastener may be a hex-nut that threadably engages with corresponding threads included on the sensor aperture. Oxygen sensor 200 includes cabling 208 that is coupled to oxygen sensor 200 at the grommet portion 202.

In at least some embodiments, oxygen sensor 200 is thermally coupled to the heated power source exhaust and/or the power source exhaust duct 210. Because the sensing element is directly exposed to the power source exhaust, the sensing element is in thermal contact with the power source exhaust gas. Additionally, hex portion 204 may be in direct physical contact with portions of the power source exhaust duct 210, such as the threaded sensor aperture. Accordingly, hex portion 204 is thermally coupled to the power source exhaust and/or power source exhaust duct 210.

Generally, power source exhaust duct 210 is not substantially thermally insulating. Accordingly, due to the close proximity, grommet portion 202 is also thermally coupled to the power source exhaust and/or power source exhaust duct 210. Accordingly, during and after operation of the power source, the various portions of oxygen sensor 200 may be at a greater temperature than the ambient air. This increased temperature may interfere with the operability and/or lifetime of oxygen sensor 200.

Figure 3A:
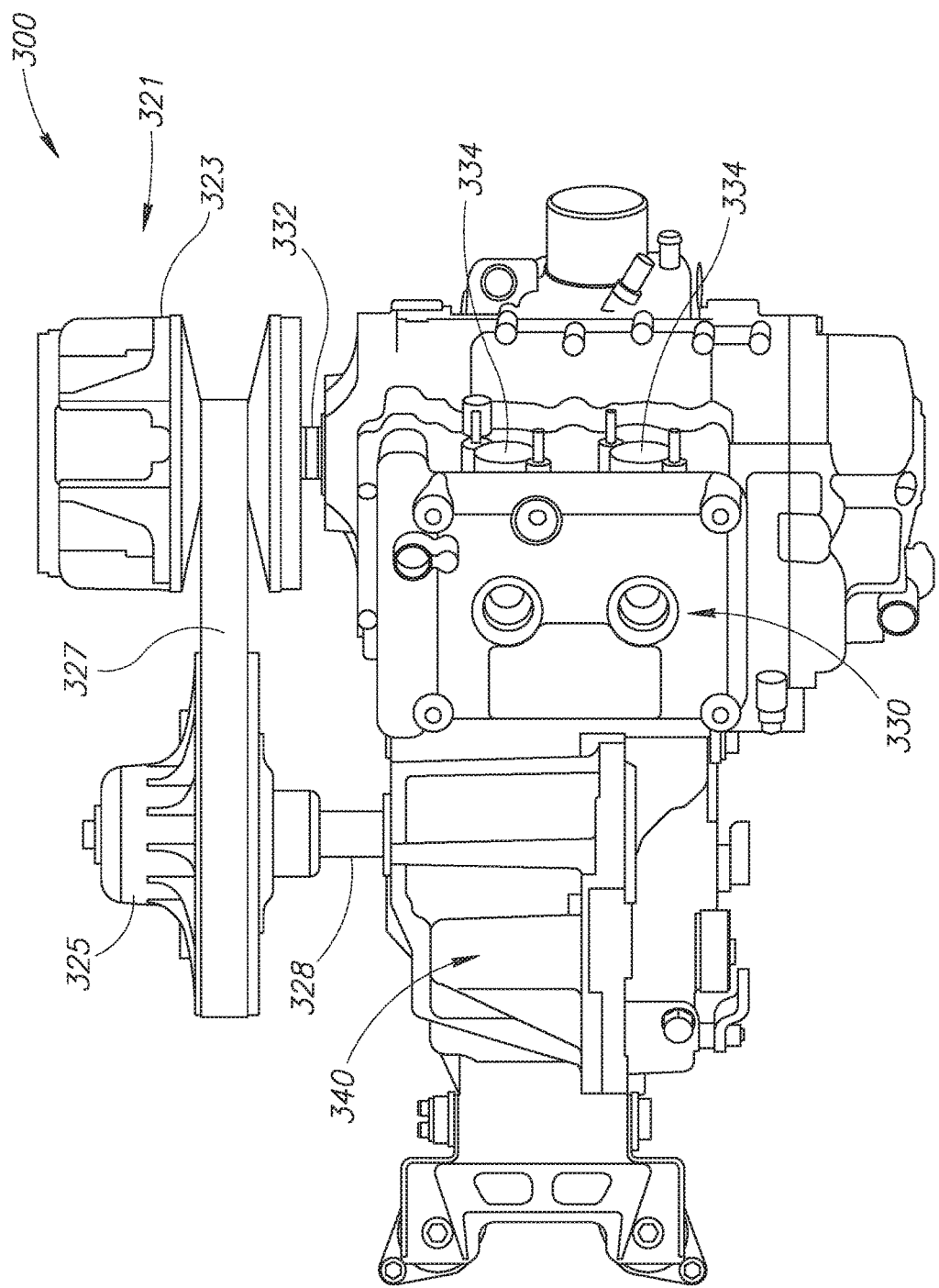
FIG. 3A illustrates a portion of a powertrain that is included in a vehicle that is consistent with the various embodiments disclosed herein.

FIG. 3A illustrates a portion of an embodiment of a powertrain that is included in a vehicle that that consistent with the various embodiments disclosed herein. A vehicle, such as vehicle 10 of FIG. 1A may include at least some of the powertrain components illustrated in FIG. 3A. Powertrain 300 includes a power source 330. Power source 330 may be an engine, motor, hybrid engine-motor device, or other such device that converts stored energy into mechanical work. In a preferred embodiment, power source 330 is an internal combustion engine.

Power source 330 includes one or more power source exhaust ports 334. Power source exhaust gas, generated in the power source's energy conversion process, is expelled through one or more power source exhaust ports 334. The power source exhaust may be provided to a power source exhaust duct, such as power source exhaust duct 210 of FIG. 2 (not shown in FIG. 3A). In some embodiments, at least one of the power source exhaust or the power source exhaust duct are at a greater temperature than the ambient air during normal vehicle operation.

Powertrain 300 includes a drivetrain. In some embodiments, the drivetrain includes at least a transmission and driveshaft assembly 340. The transmission may be an automatic, semi-automatic, or a manual transmission. In a preferred embodiment, the transmission includes a continuously variable transmission (CVT). CVT 321 is one exemplary embodiment of a continuously variable transmission. The driveshaft assembly 340 includes at least one drive-member, such as a driveshaft, drive-chain, or a drive-belt. The driveshaft assembly 340 may include a differential. In at least one embodiment, the drivetrain includes a transaxle assembly.

CVT 321 is coupled to the power source 330 by crankshaft 332. CVT 321 includes drive clutch 323 and driven clutch 325. Drive clutch 323 and driven clutch 325 are coupled by transmission belt 327. Power from power source 330 is transmitted to drive clutch 323 via crankshaft 332. In some embodiments, drive clutch 323 rotates at a first frequency based on the rotational frequency of the power source 330. At least a portion of this rotational energy is transmitted to driven clutch 325 via transmission belt 327. The driven clutch 325 rotates at a second frequency.

The ratio of the first frequency to the second frequency is dependent upon the ratio of the instantaneous running radius of the drive clutch 323 to the radius of the driven clutch 325. The driven clutch 325 transfers at least a portion of the rotational energy to the driveshaft assembly 340 via input shaft 328. The driveshaft assembly 340 transfers at least a portion of this rotational energy to at least one of the vehicle's ground engaging members, such as ground engaging members 2 of FIG. 1A.

Figure 3B:
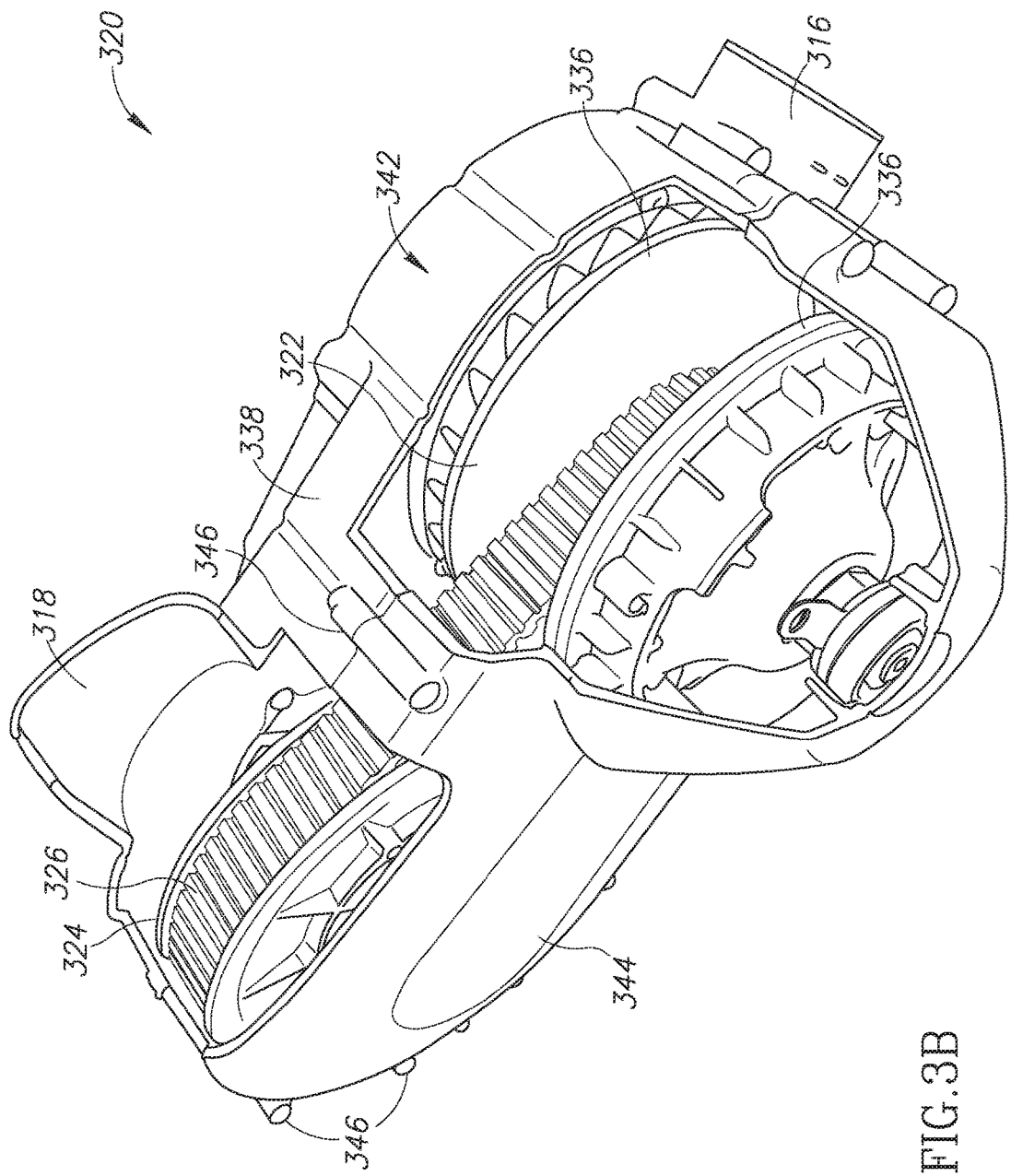
FIG. 3B illustrates another embodiment of a Continuously Variable Transmission (CVT) within a CVT cover that has been partially cut-away to reveal various CVT components.

FIG. 3B illustrates another embodiment of a continuously variable transmission: CVT 320. Some features of CVT 320 may be somewhat or substantially similar, analogous, or a counterpart of features included in CVT 321 of FIG. 3A. Other features of CVT 320 may be somewhat or substantially dissimilar, different, alternative to, or not included in CVT 320. Likewise, CVT 321 may include features that are alternative to or have no analog and/or counterpart in CVT 320. Both CVT 320 and CVT 321 are consistent with embodiments disclosed herein. CVT 320 and CVT 321 are exemplary transmissions only and the embodiments disclosed herein are not constrained by these exemplary transmissions.

CVT 320 is housed within CVT cover 342 that has been partially cut-away to reveal various CVT components. The CVT 320 has a driven clutch 324, a drive clutch 322, and a transmission belt 326 between the driven clutch 324 and the drive clutch 322. The drive clutch 322 is coupled to a power-source crankshaft, such as power-source crankshaft 332 of FIG. 3A. Drive clutch 322 receives power from a power source, such as power source 330 of FIG. 3A. Drive clutch 322 transmits this power through the transmission belt 326 to the driven clutch 324, and eventually from the driven clutch 324 to the vehicle's ground engaging members.

The drive clutch 322 can have two conical sheaves 336 holding the transmission belt 326 between them. Moving the sheaves 336 toward and away from one another changes the effective gear ratio of the drive and driven clutch system. As the sheaves 336 of the drive clutch 322 move farther apart the belt drops to a lower location on the sheaves 336 and to a higher location on the sheaves of the driven clutch 324. Conversely, as the drive sheaves 336 move closer together, the driven sheaves mover farther apart. Thus, the gear ratios from input to output smoothly change, thereby achieving a continuously variable transmission. Although, all the movement of the belt sides along the sides of the sheaves as the clutches are turning creates heat. Aspects of the present invention can also be used with other transmissions and with other engine casing components.

The backside (first portion 338) of CVT cover 342 surrounds the side of the CVT 320 adjacent the power source and transmission. CVT cover 342 protects the moving parts of CVT 320. CVT cover 342 also serves as a channel through which air moves to cool various CVT components, such as drive sheaves 336, driven clutch 324, and transmission belt 326. The cover includes a transmission air inlet 316 near the drive clutch 322 and a transmission air outlet 318 near the driven clutch 324. The positions of the transmission air inlet 316 and transmission outlet 318 can vary slightly, but preferably the transmission air inlet 316 and transmission air outlet 318 are on substantially opposing sides of CVT cover 342 to permit the air to flow over the components of the CVT 320 and out the other side.

CVT cover 342 is formed of two portions: a first portion 338, and a second portion 344. The two portions 338, 344 are split along a line parallel with transmission belt 326. The two portions are held together by bolts through bosses 346 around the periphery of CVT cover 342. The bosses are preferably on the external portion of the CVT cover 342 to allow smoother airflow in the interior of CVT cover 342 for better cooling.

The first portion 338 can be on the power source side and the second portion 344 can be on the wheel side, or vice versa. In the illustrated embodiment of FIG. 3B, the first portion 338, in which the transmission air inlet 316 and transmission air outlet 318 are formed, are both on the engine side of CVT 320. Depending on the configuration of CVT 320 and the power source, the heat builds up more significantly on the power source side of CVT 320. However, in a different configuration, the heat may be more concentrated elsewhere, in which cover the transmission air inlet 316 and transmission air outlet 318 can be positioned accordingly.

As noted above, inefficiencies create heat, such as the movement of transmission belt 326 along the drive clutch 322 and driven clutch 324. In order to cool the transmission components, such as transmission belt 326, driven clutch 324, and drive clutch 322, ambient air flows from a vehicle air intake, such as air intake 18 of FIG. 1A, and into CVT cover 342 through transmission air inlet 316. As the ambient air flows through the volume surrounding CVT 320, the various CVT components are cooled.

Heat exchanged between this ambient air and CVT 320 produces heated drivetrain exhaust, such as heated transmission exhaust. The transmission exhaust is at a greater temperature and pressure than the ambient air. The drivetrain exhaust is expelled from the CVT cover 342 through transmission air outlet 318. In at least one embodiment, transmission air outlet 318 is a drivetrain exhaust port. In at least one embodiment, the drivetrain exhaust is expelled through the drivetrain exhaust port at least partially due to the increased pressure of the heated air within the drivetrain housing. As shown in FIG. 3B, the fins on the drive clutch and the driven clutch also function as a pump to expel the drivetrain exhaust.

Figure 3C:
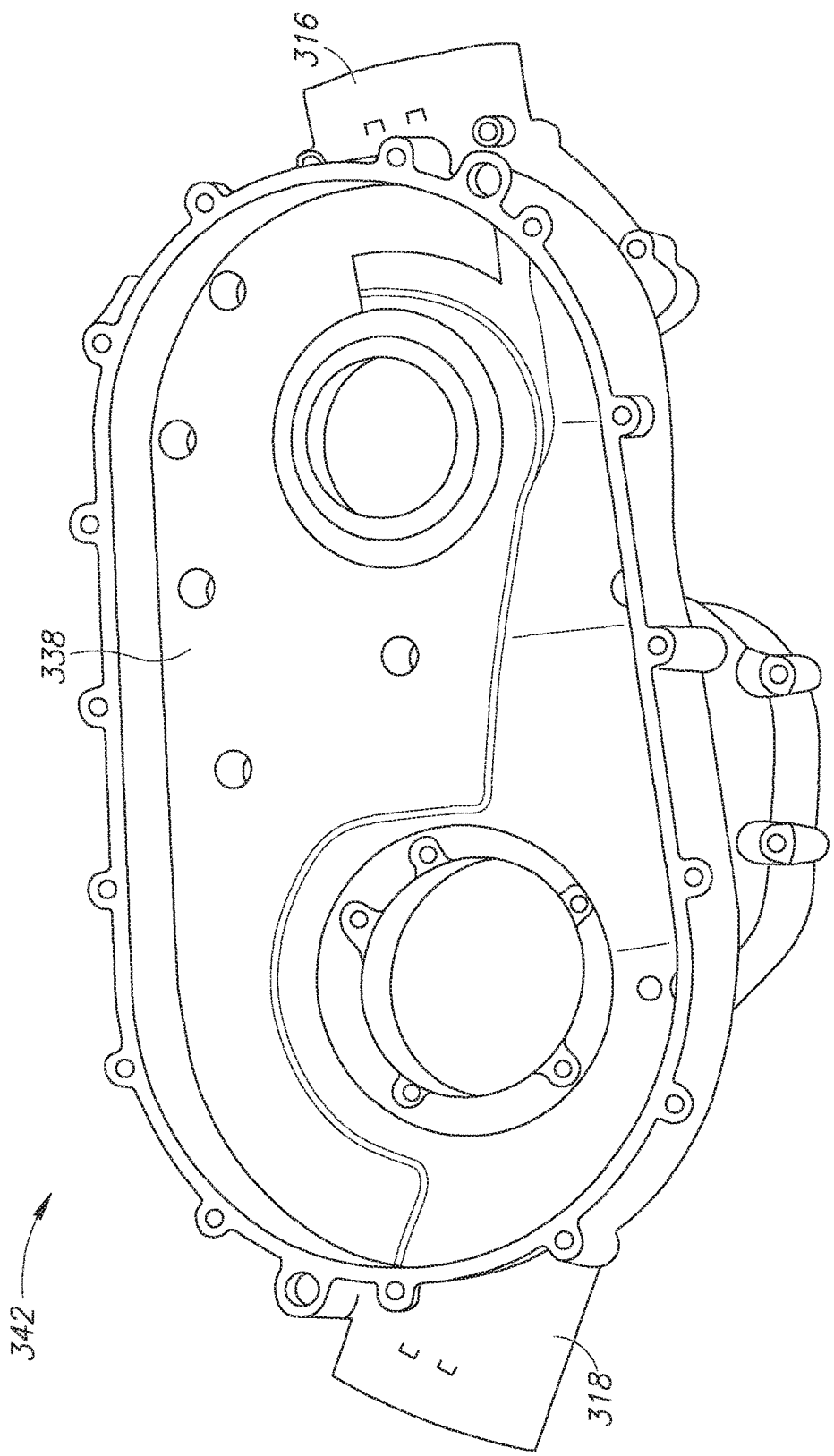
FIG. 3C illustrates an interior view of a portion of the CVT cover according to various embodiments disclosed herein.

FIG. 3C illustrates an interior view of a portion of CVT cover 342 according to various embodiments disclosed herein. CVT cover 342 includes first portion 338. First portion 338 of CVT cover 342 includes various features and surfaces that enhance the airflow of cooling ambient air received by the transmission air inlet 318 and the drivetrain exhaust expelled through transmission air outlet 318 or drivetrain exhaust port. In some embodiments, a second portion (not shown in FIG. 3C) may also include similar airflow-enhancing features and/or surfaces. As the fins or blades included on the drive and driven clutches pump air in through air inlet 316 and out air outlet 318, these features and/or surfaces guide or channel the flow of air that cools the transmission components.

Figure 3D:
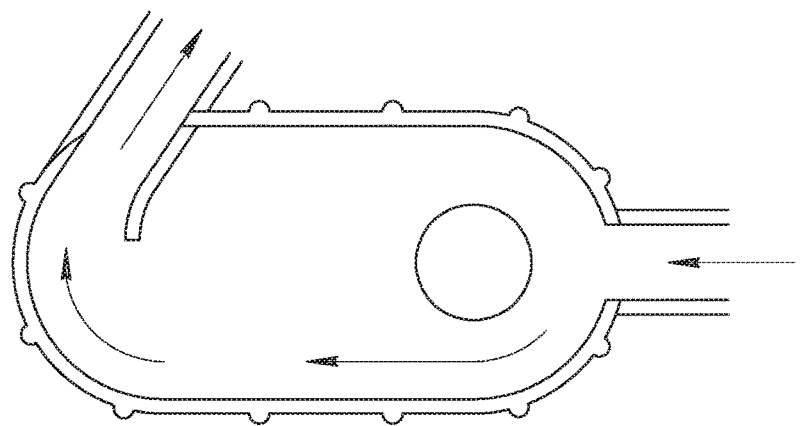
FIGS. 3D-3F illustrates the flow of cooling air through various embodiments of CVTs that are consistent with the various embodiments disclosed herein.
Figure 3E:
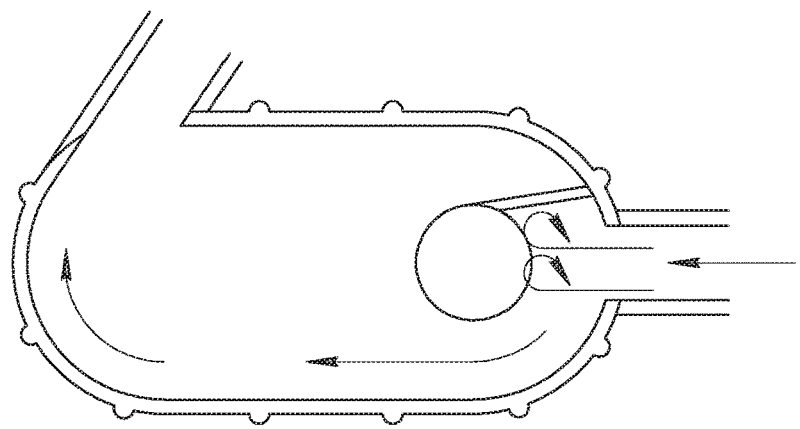
Figure 3F:
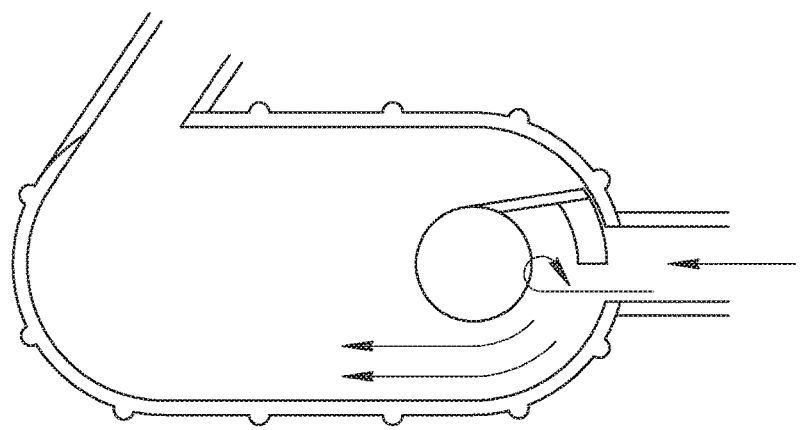

FIGS. 3D-3F illustrates the flow of cooling air through various embodiments of CVTs that are consistent with the various embodiments disclosed herein. Note that the flow of air through the CVT casing is dependent upon various features included in the CVT cover 342.

In preferred embodiments, as the drivetrain exhaust exits CVT cover 342 through transmission air outlet 318, the power source exhaust is at a substantially greater temperature than the drivetrain exhaust. Thus, relative to the power source exhaust, the drivetrain exhaust is cooling exhaust or air. In at least one embodiment, the power source exhaust is approximately 900° C. under normal vehicle operating conditions. The powertrain exhaust may be between 200° C. and 300° C. under normal vehicle operating conditions In some embodiments, a device such as a sensor or a switch is thermally coupled to the power source exhaust, such as oxygen sensor 200 in FIG. 2. The device may malfunction, operate unreliably, experience a decreased lifetime, catastrophically fail, or otherwise cease to function once heated beyond a critical temperature. Due to the substantial temperature of the power source exhaust, the device may be heated close to or beyond this critical temperature during normal vehicle operating conditions. In some embodiments, the temperature differential between the power source exhaust and the drivetrain exhaust, as well as the pressure differential between the drivetrain exhaust and the ambient air is employed to cool the device to a temperature within an acceptable temperature window.

Figure 4:
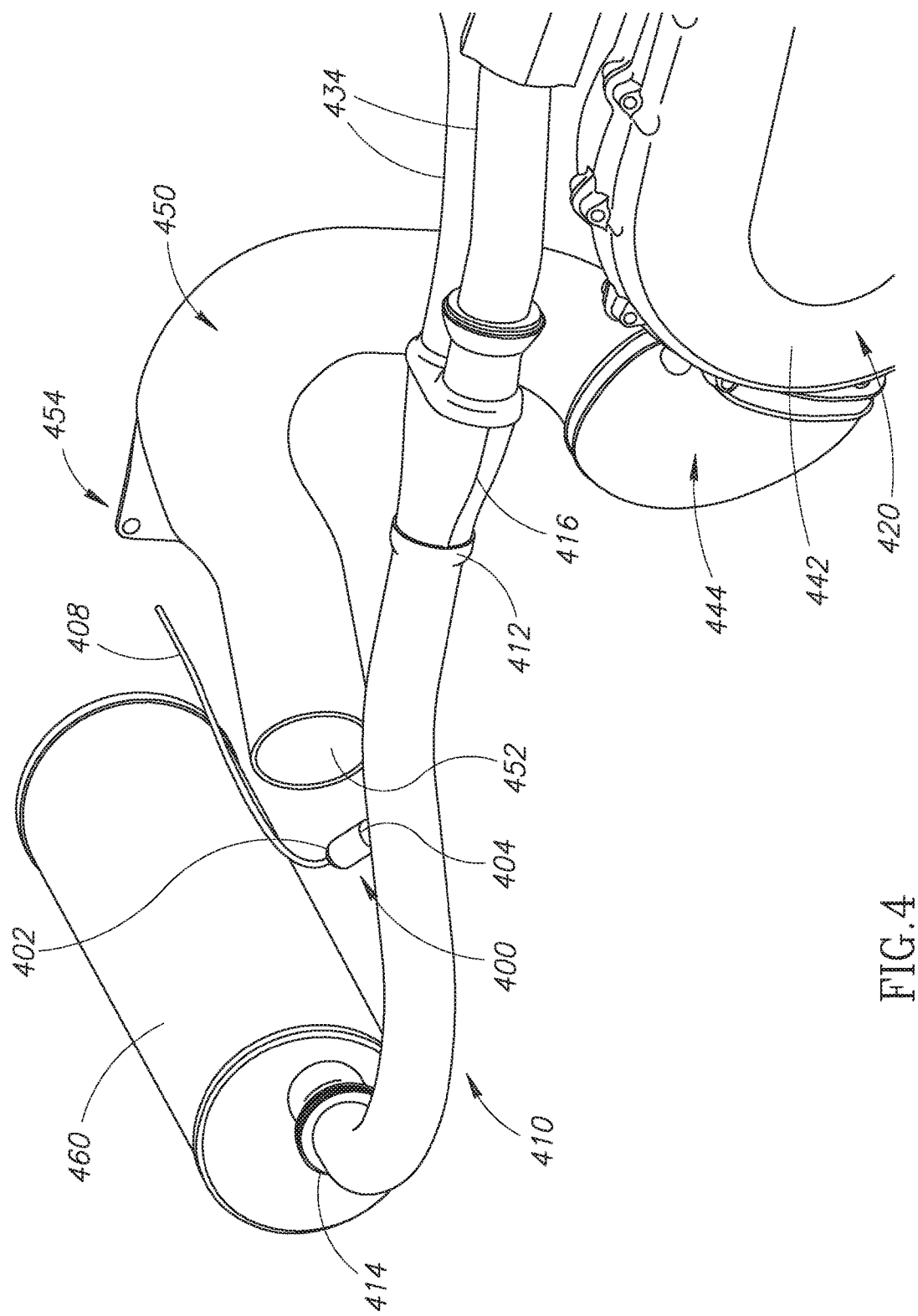
FIG. 4 illustrates an isometric side view of a powertrain exhaust duct that is coupled to the powertrain of a vehicle and employed to cool a device included with the vehicle in a cooling method that is consistent with the various embodiments disclosed herein.

FIG. 4 illustrates an isometric side view of a drivetrain exhaust duct that is coupled to the drivetrain of a vehicle. The cooler drivetrain exhaust is employed to cool a device included with the vehicle in a cooling method that is consistent with the various embodiments disclosed herein. The drivetrain may be included in a vehicle, such as vehicle 10 of FIG. 1A. The drivetrain may include various components, including but not limited to a transmission, such as CVT 321 of FIG. 3A or CVT 320 of FIG. 3B.

In a preferred embodiment, device 400 is an oxygen sensor, such as oxygen sensor 100 of FIG. 1C. Although other embodiments are not so constrained, and device 400 may include any other sensor, switch, integrated circuit (IC), semiconductor component, or any other device included in a vehicle. Device 400 may be a component. Device 400 is coupled to power source exhaust duct 410, in a similar manner to that described in the discussion of FIG. 2 and in regards to coupling oxygen sensor 200 to power source exhaust duct 210. As also discussed in regards to FIG. 2, device 400 is thermally coupled to the power source exhaust and or power source exhaust duct 410. Device 400 may include a sensing element portion (not shown) that is exposed to the power source exhaust gas. Device 400 may include a hex portion 404, a grommet portion 402, and cabling 408.

In some embodiments, a power source exhaust manifold 416 is employed to couple power source exhaust duct 410 to the vehicle's power source (not shown). Power source exhaust duct 410 may be coupled to power source exhaust manifold 416 at the power source exhaust duct input aperture 412. The vehicle's power source is similarly situated as power source 330 of FIG. 3A. In various embodiments, other auxiliary power source exhaust ducts 434 are intermediate the power source exhaust manifold 416 and power source exhaust ports, such as exhaust ports 334 of FIG. 3A. In at least one embodiment, power source exhaust enters the power source exhaust duct 410 through power source exhaust duct input aperture 412.

Power source exhaust duct 410 may be coupled to vehicle muffler 460 at power source exhaust duct output aperture 414. Power source exhaust gas flows from power source exhaust duct 410 to muffler 460 via power source exhaust output aperture 414. In some embodiments, at least a portion of the power source exhaust gas is provided to a catalytic converter by the power source exhaust duct 410. Because of the substantial temperature of the power source exhaust gas, the power source exhaust duct 410 may be at a temperature significantly greater than that of the ambient air during or after normal operation of the power source.

In some embodiments, a drivetrain exhaust duct 450 is employed to provide drivetrain exhaust gas to a volume proximate the device 400. Drivetrain exhaust duct 450 may be an exhaust pipe. Drivetrain exhaust duct 450 may be a conduit. Drivetrain exhaust duct 450 may be constructed from metal, plastic, or any material that can withstand the elevated temperatures of drivetrain exhaust and be in close proximity to power source exhaust duct 410.

In some embodiments, drivetrain exhaust gas may be transmission exhaust gas. Drivetrain exhaust duct 450 may be coupled to a drivetrain component. In a preferred embodiment, drivetrain exhaust duct 450 is coupled to a transmission 420 included in the vehicle's drivetrain. In at least one embodiment, drivetrain exhaust duct 450 is coupled, either directly or indirectly, to a transmission air outlet, such as transmission air outlet 318 of FIGS. 3B and 3C. The transmission may be an automatic transmission, a semi-automatic transmission, or a manual transmission. Transmission 420 may be a CVT, such as CVT 321 of FIG. 3A or CVT 320 of FIG. 3B. In at least one embodiment, drivetrain exhaust duct 450 is coupled to a torque converter.

Transmission 420 is housed in a transmission housing that includes transmission cover 442. A drivetrain exhaust manifold 444 may be employed to couple drivetrain exhaust duct 450 to a drivetrain exhaust port included in transmission 420. Drivetrain exhaust manifold 444 may be a coupler. For instance, drivetrain exhaust manifold may be positioned between a transmission air outlet and the drivetrain exhaust duct 450. Drivetrain exhaust manifold 444 may be coupled to transmission 420 by employing a fastener, such as a hose-clamp.

In some embodiments, drivetrain exhaust duct 450 may include a frame-mounting bracket 454. Frame mount bracket 454 may be employed to secure and/or stabilize drivetrain exhaust duct 450 to the frame, such as frame 16 of FIG. 1A. Drivetrain exhaust duct 450 may be coupled to the vehicle frame by employing any suitable fastener, such as bolts or the like. In at least one embodiment, a cable tie is employed to couple the drivetrain exhaust duct 450 to the frame, through an aperture in frame mounting bracket 454. A cable tie may be a Zip-Tie®.

Drivetrain exhaust gas (i.e., cooling air) is delivered to a volume that is proximate to device 400 through drivetrain exhaust duct output aperture 452. In preferred embodiments, the temperature of the transmission exhaust gas is less than the temperature of the power source exhaust gas and the temperature of power source exhaust duct 410. Because device 400 is thermally coupled to the power source exhaust gas and power source exhaust duct 410, at least portions of device 400 are at temperatures that exceed the temperature of drivetrain exhaust gas. The drivetrain exhaust gas that is delivered to the volume that is proximate to device 400 provides ventilation and cools device 400 through advection.

In some embodiments, the drivetrain exhaust gas includes air that was provided to transmission 420 through a vehicle air intake, such as air intake 18 of FIG. 1. This air is somewhat heated within the transmission housing, but not nearly to the same degree as the power source exhaust gas. As described in the context of FIGS. 3B-3F, air is circulated through the transmission housing with the assistance of fins or blades included on various rotating components of the transmission, such as drive and/or driven clutches. In preferred embodiments, structures and/or surfaces within the transmission housing provide additional assistance in the airflow through and out of the transmission casing. As the air flows across the transmission components, the air cools the components. This heat exchange heats the air. The pumping action of the fins and/or blades of the rotating transmission components, along with structures and/or surfaces internal to the transmission housing, pumps the drivetrain exhaust out of a transmission air outlet and through the drivetrain exhaust duct 450. In at least one embodiment, additional mechanical means, such as a fan or a pump, are employed to provide additional assist in the flow or circulation of drivetrain exhaust to the device 400

Drivetrain exhaust within the transmission housing is at a first temperature and a first pressure. In some embodiments, the first temperature may be between 200° C. and 300° C. The portion of the drivetrain exhaust gas that is provided to the volume that is proximate to device 400 via drivetrain exhaust duct 450 is at another temperature and another pressure. The other pressure is less than the first pressure. In some embodiments, depending on the ambient temperature and the thermal insulating properties of drivetrain exhaust duct 450, the other temperature is less than the first temperature due to cooling of the drivetrain exhaust during travel through drivetrain exhaust duct 450.

The difference between the first pressure and the other pressure is the pressure drop across the drivetrain exhaust duct 450. This pressure drop may provide additional pumping action to circulate the drivetrain exhaust during travel through drivetrain exhaust duct 450. In some embodiments, drivetrain exhaust duct 450 is configured and arranged to minimize, or at least decrease, this pressure drop. The drivetrain exhaust flow rate and the pressure drop across drivetrain exhaust duct 450 depend upon various factors, including but not limited to the various rotational frequencies of the transmission components, the arrangement and configuration of any blades and/or fins included with any rotating transmission components, structures or surfaces internal to the transmission housing, the first pressure, the first temperature, the ambient air temperature, the pressure, and the inclusion of any additional mechanical means such as fans and/or air pumps.

The drivetrain exhaust flow rate and the pressure drop across drivetrain exhaust duct 450 also depend upon various physical characteristics of the drivetrain exhaust duct 450 and the drivetrain exhaust manifold 444. These features include but are not limited to the duct and/or manifold's lateral cross section, total path length that exhaust gas must travel, bends or other features that may induce backpressure, total vertical distance that exhaust gas must travel, and other geometrical considerations. In certain embodiments, any of these features may be varied to suit the cooling needs of device 400.

The capability to cool device 400 depends upon the flow rate of drivetrain exhaust gas from drivetrain exhaust duct output aperture 452, the temperature of the drivetrain exhaust at the drivetrain exhaust duct output aperture 452, the temperature of the various portions of device 400, the temperature of the power source exhaust, the temperature of the power source exhaust duct 410, the lateral cross section of the drivetrain exhaust duct output aperture 452, distance between drivetrain exhaust output aperture 452 and the various portions of device 400, the speed of the vehicle, the ambient air temperature, and other such factors.

In some embodiments the shape, geometry, and/or position of the drivetrain exhaust duct 450 and/or drivetrain exhaust manifold 444 may be based on the cooling requirements for device 400, and other factors. These other factors include, but are not limited to the temperature differential between the power source exhaust and the drivetrain exhaust, the pressure differential between the drivetrain exhaust and the ambient air, the power to be transmitted to the vehicle's ground engaging members, the expected operating conditions, such as engine load, terrain to be traversed, and climate of the vehicle. In at least one embodiment, drivetrain exhaust output aperture 452 is positioned closer to device 400 for enhanced cooling capability.

In at least one embodiment, a duct-extender may be coupled to drivetrain output aperture 452 to decrease the distance between the location of drivetrain exhaust duct's 410 output and device 400. The lateral cross section of the duct-extender may be varied to increase or decrease the lateral cross section of the drivetrain's output. In at least one embodiment, the duct-extender may provide a fan-out or output manifold structure to deliver drivetrain exhaust to a plurality of locations and/or volumes to cool other devices.

Although device 400 is coupled to the power source exhaust duct 410, other embodiments are not so constrained. Device 400 may be located at other vehicles locations and may be at a temperature greater than that of the drivetrain exhaust. The shape, orientation, and location of drivetrain exhaust duct 450 may be varied to provide cooling drivetrain exhaust to other regions of the vehicle. In addition to an oxygen sensor, device 400 may include device types, such as but not limited to voltage regulators, gear selector switches, power distribution modules, engine control units, coolant temperature sensors, microcontrollers, processor devices, digital memory devices, field programmable gate arrays (FPGAs), accelerometers, communication transceivers, or any other component that may, due to its proximity to heating sources on the vehicle, may reach temperatures greater than that of the drivetrain exhaust gas. In some embodiments, device 400 is heated at least partially because device 400 is itself a heat source. Such heat source device types may include, but are not limited to integrated circuits that generate electrical current and/or mechanical components that generate friction. In at least one embodiment, drivetrain exhaust duct 450 may be configured and arranged to provide drivetrain exhaust to a plurality of devices that are positioned at disparate locations via a fan-out or manifold structure.

In alternative embodiments, some vehicles may be configured and arranged to operate in cold climates, such as arctic regions or high altitude locations. Some devices included in the vehicle may include temperature specifications with a lower temperature bound that is greater than the ambient temperature of the expected climate of operation. In such situations, the transmission exhaust duct 450 may be employed to heat such devices by providing the warmer drivetrain exhaust gas to the device of vehicle region to be warmed.

Figure 5:
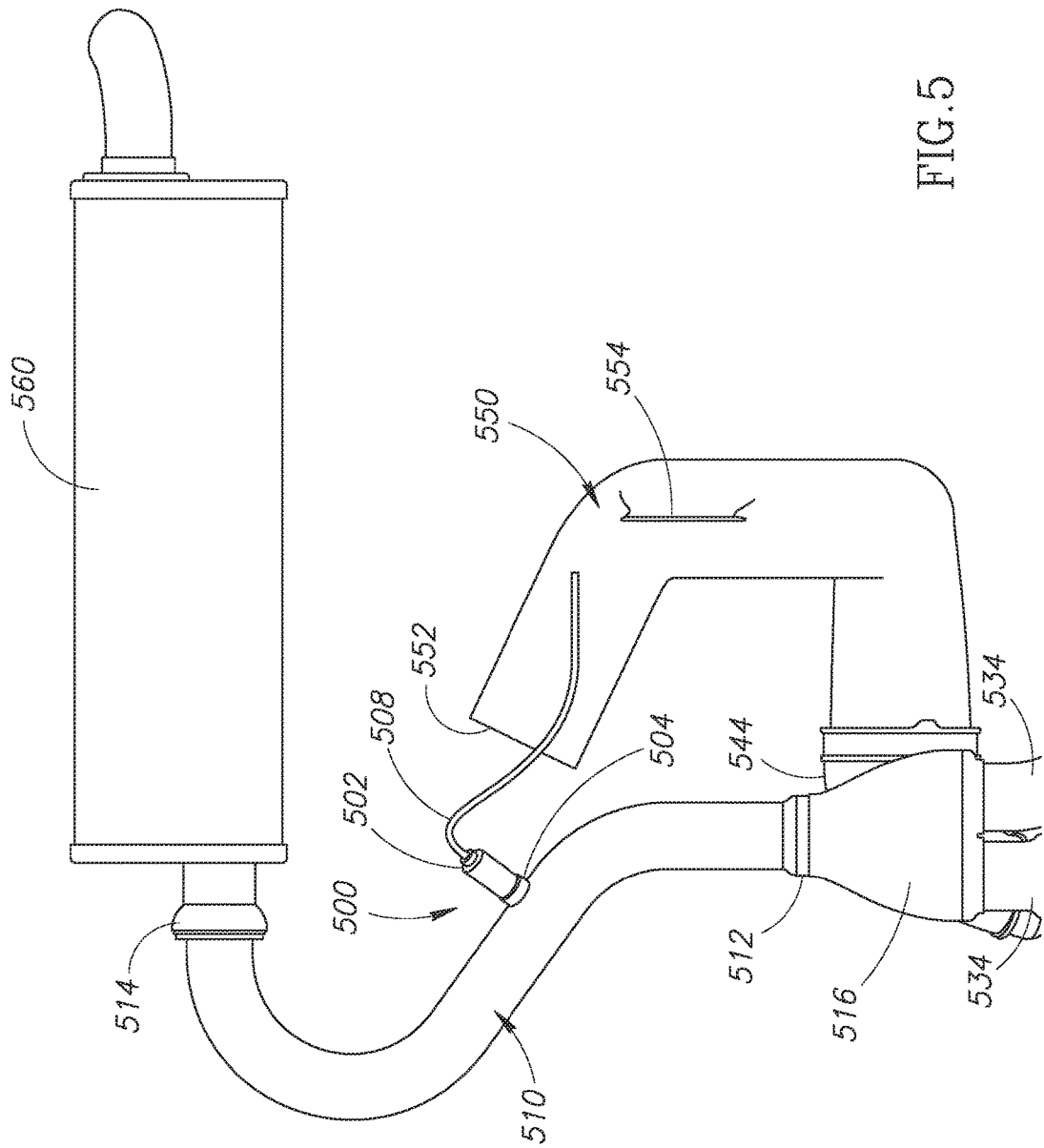
FIG. 5 illustrates an orthographic top view of a powertrain exhaust duct that is coupled to the powertrain of a vehicle and employed to cool a device included with the vehicle in a cooling method that is consistent with the various embodiments disclosed herein.

FIG. 5 illustrates an orthographic top view of a powertrain exhaust duct that is coupled to the powertrain of a vehicle and employed to cool a device included with the vehicle in a cooling method that is consistent with the various embodiments disclosed herein. The embodiment illustrated in FIG. 5 includes similar features to the embodiments illustrated in FIG. 4.

Power source exhaust may flow from the vehicle's power source (not shown) to muffler 560, through auxiliary power source exhaust ducts 534, then through power source exhaust manifold 516, and into power source exhaust duct 510. Power source exhaust gas may enter power source exhaust duct 510 through power source exhaust duct input aperture 512 and exit through power source exhaust duct output aperture 514.

Device 500 is thermally coupled to power source exhaust gas and/or power source exhaust duct 510. Device 500 may include a sensing element portion (not shown). Device 500 includes a hex portion 504, a grommet portion 502, and cabling 508.

Device 500 is cooled through advection by drivetrain exhaust air provided to device 500 via a drivetrain exhaust duct 550. Drivetrain exhaust duct 550 is coupled to the vehicle's drivetrain through drivetrain exhaust manifold 544. The source of the drivetrain exhaust may be a transmission, such as a CVT. The transmission exhaust gas is delivered to a volume that is proximate to device 500 through drivetrain exhaust duct output aperture In some embodiments, drivetrain exhaust duct 510 is coupled to the vehicles frame via frame mounting bracket 554.

Figure 6:
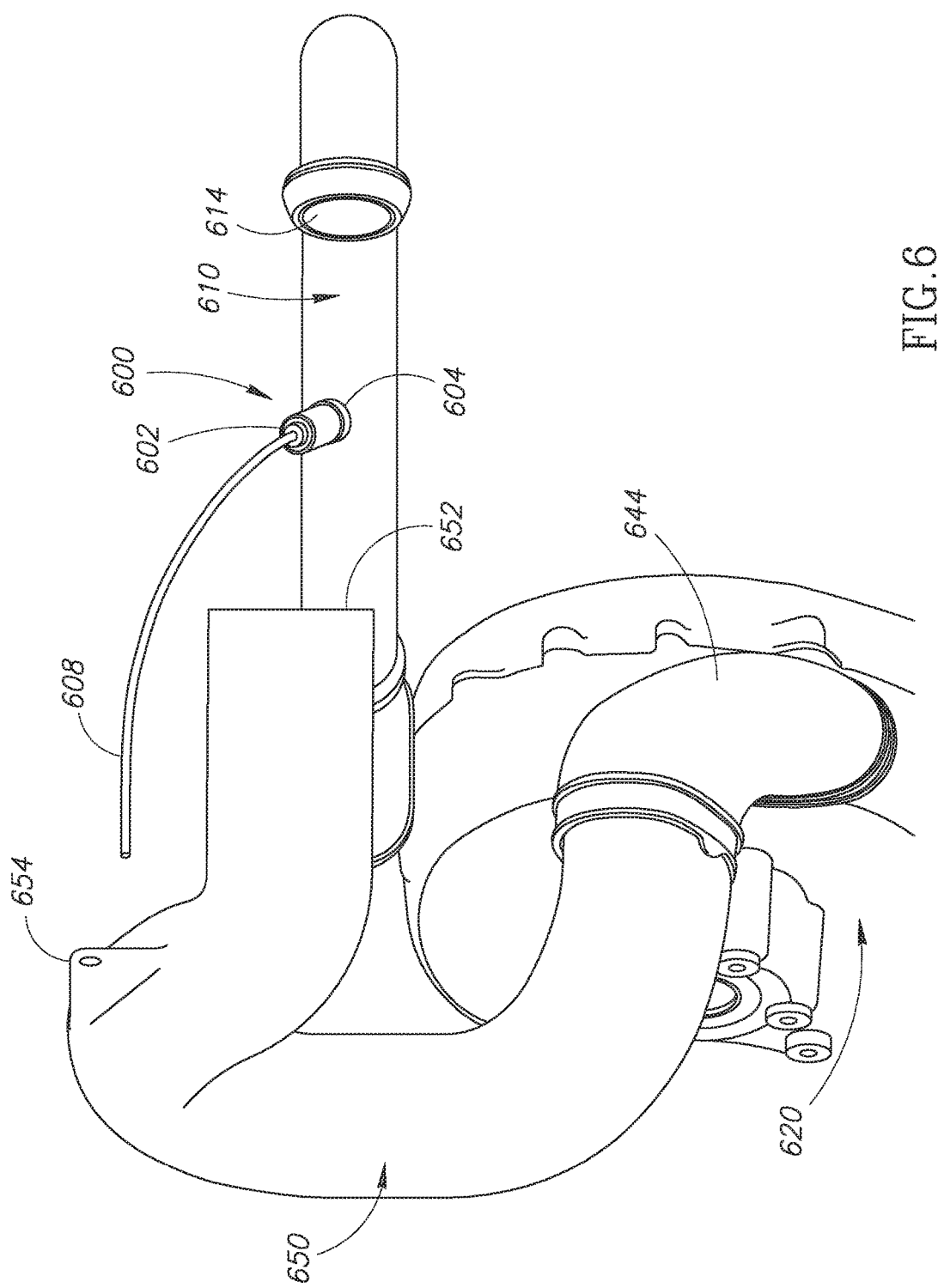
FIG. 6 illustrates another view of a powertrain exhaust duct that is coupled to the powertrain of a vehicle and employed to cool a device included with the vehicle in a cooling method that is consistent with the various embodiments disclosed herein.

FIG. 6 illustrates another view of a powertrain exhaust duct that is coupled to the powertrain of a vehicle and employed to cool a device included with the vehicle in a cooling method that is consistent with the various embodiments disclosed herein. The embodiment illustrated in FIG. 6 includes similar features to the embodiments illustrated in FIG. 4 and FIG. 5.

Power source exhaust may flow through power source exhaust duct 610. Power source exhaust gas may enter power source exhaust duct 610 and exit out through power source exhaust duct output aperture 614.

Device 600 is thermally coupled to power source exhaust gas and/or power source exhaust duct 610. Device 600 may include a sensing element portion (not shown). Device 600 includes a hex portion 604, a grommet portion 602, and cabling 608.

Device 600 is cooled through advection by drivetrain exhaust air provided to device 600 via a drivetrain exhaust duct 650. Drivetrain exhaust duct 650 is coupled to the vehicle's drivetrain through drivetrain exhaust manifold 644. The source of the drivetrain exhaust may be a transmission, such as a CVT 620. The transmission exhaust gas is delivered to a volume that is proximate to device 600 through drivetrain exhaust duct output aperture 652. In some embodiments, drivetrain exhaust duct 610 is coupled to the vehicles frame via frame mounting bracket 654.

Figure 7:
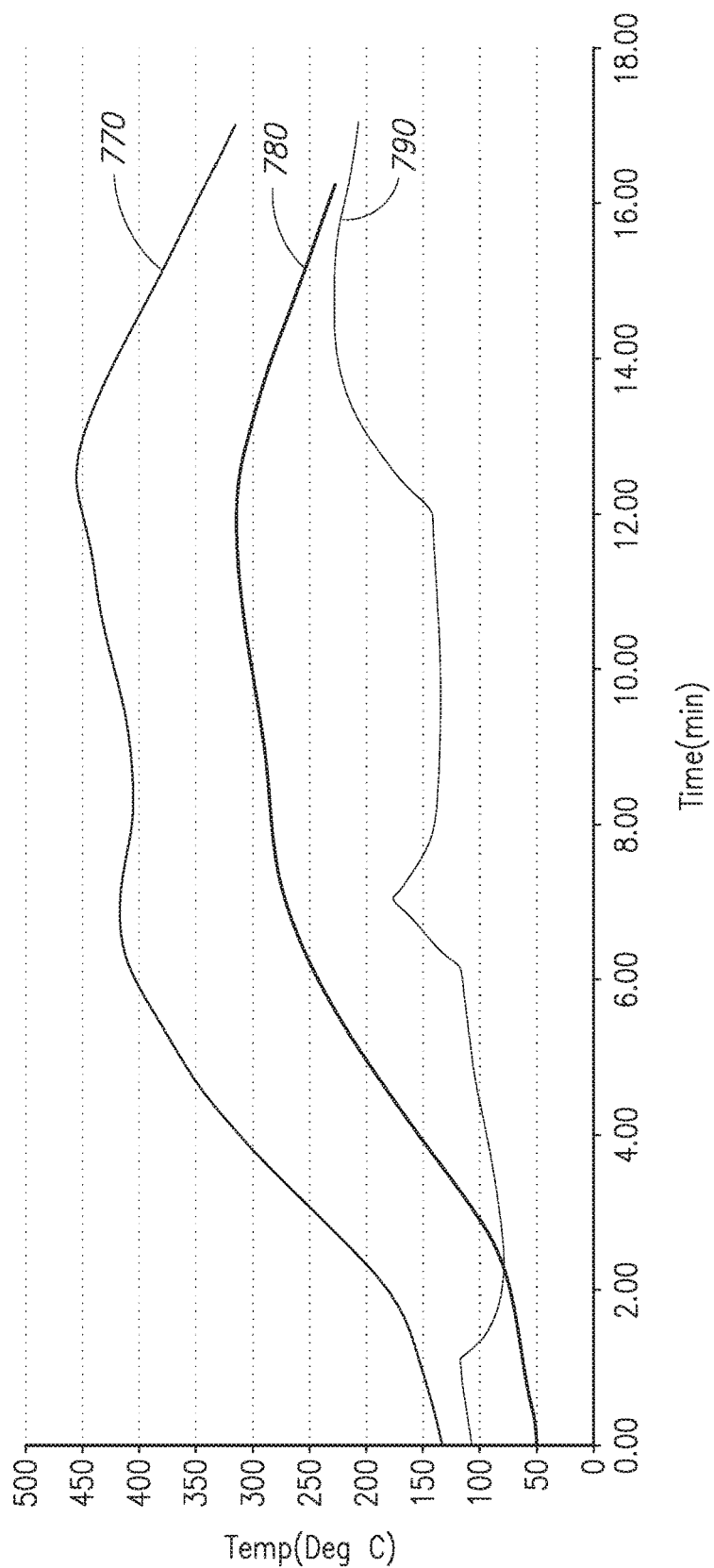
FIG. 7 illustrates temperature vs. time series data for the grommet portion of an oxygen sensor, such as the oxygen sensor of FIG. 1C, that is thermally coupled to an exhaust system of a vehicle, such as the vehicle of FIG. 1A or the alternative vehicle of FIG. 1B. The oxygen sensor was cooled with a method consistent with the various embodiments disclosed herein.

FIG. 7 illustrates temperature time series data for the grommet portion of an oxygen sensor, such as the oxygen sensor 100 of FIG. 1C, that is thermally coupled to an exhaust system of a vehicle, such as vehicle 10 of FIG. 1A or alternative vehicle of FIG. 1B. The oxygen sensor was cooled with a method consistent with the various embodiments disclosed herein. Temperature data was acquired for 17 continuous minutes. The x-axis of the plot represents time in minutes and the y-axis of the plot represents temperature in degrees centigrade.

During the test sequence, the vehicle was toggled between an idle state, a ground-speed state, and an off state. During an idle state, the vehicle's engine was idling and the vehicle was not moving. During the idle state, engine exhaust is generated (but at an idle or low engine speed). The exhaust gas heats the oxygen sensor. Because the vehicle is not moving, the transmission is not transmitting power to the wheels. Accordingly, there is very little, if any, transmission exhaust providing ventilation to the oxygen sensor during the idle state.

During the ground-speed state, both the engine speed and the ground speed are increased. Accordingly, the oxygen sensor is simultaneously heated by the engine exhaust and, during some of the tests, cooled by the transmission exhaust during the ground-speed state. During the off state, the engine is turned off. Accordingly, the oxygen sensor is not being heated by engine exhaust and is not being ventilated by the transmission exhaust. During the off state, the oxygen sensor is being cooled by the ambient air and heat diffusion. The test sequence during data acquisition was as follows, where t is the x-axis value: idle state for $0 \leq t < 1$ min, ground-speed state for $1 \leq t < 6$ min, idle state for $6 \leq t < 7$ min, ground-speed state for $7 \leq t < 12$ min, off state for $12 \leq t < 17$ min.

Curve 770 illustrates the grommet portion temperature, as a function of time during the above test sequence, for an "original pipe" configuration. Herein, the "original pipe" refers to a configuration where the oxygen sensor was housed within heat shields to protect various components from engine exhaust heat, rather than being cooled with transmission exhaust during the ground-speed states of the test. The oxygen sensor was located mid-way through the exhaust stream and housed within the set of heat shields. The heat shields decreased ambient airflow to the oxygen sensor. The temperature of the grommet portion of the oxygen sensor, at t=0 mins for curve 770, as well as the other curves presented in FIGS. 7, 8 and 9, is greater than the ambient air temperature because the oxygen sensor was already warm due to previous testing.

Curve 780 illustrates the grommet portion temperature, as a function of time during the above test sequence, for a "new pipe" configuration. Herein, the "new pipe" configuration refers to a configuration where the oxygen sensor was moved downstream along the exhaust system, but not cooled with transmission exhaust during the ground-speed states of the test.

Curve 790 illustrates the grommet portion temperature, as a function of time during the above test sequence, for a "new pipe and transmission exhaust duct" configuration. Herein, the "new pipe and transmission exhaust duct" configuration refers to placing the oxygen sensor downstream as discussed above and cooling the oxygen sensor with transmission exhaust during the ground-speed states of the test As shown by curves 770, 780, and 790, cooling the oxygen sensor with transmission exhaust results in significant decreases in temperature of the grommet portion of the oxygen sensor. At t=0 mins, the temperature of curve 790 is significantly greater than that of curve 780 (due to different previous testing conditions). However, within approximately 1 minute of being cooled with exhaust gas (at t~2 mins), curve 790 is cooled to a temperature less than the curve 780 (not being cooled by transmission exhaust).

Figure 8:
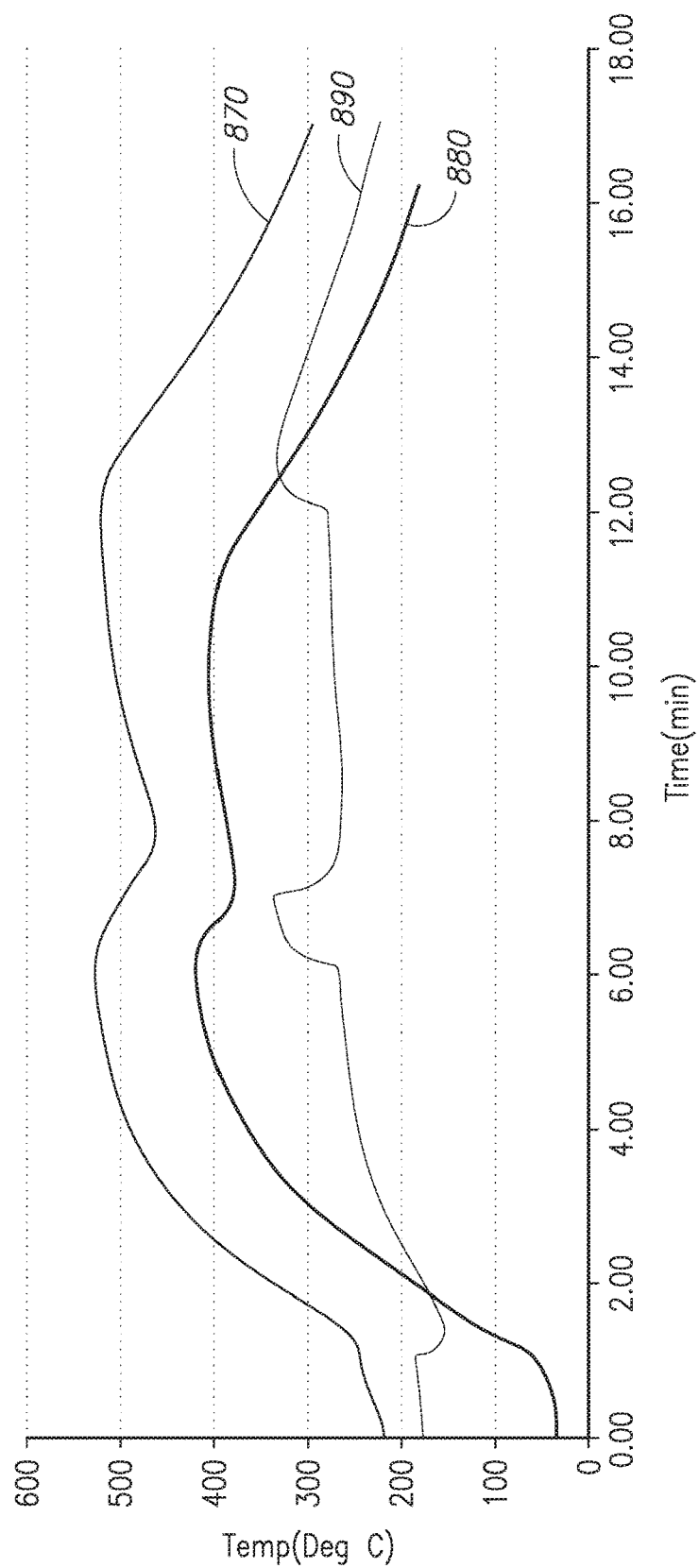
FIG. 8 illustrates temperature vs. time series data for the hex portion of an oxygen sensor, such as the oxygen sensor of FIG. 1C, that is thermally coupled to an exhaust system of a vehicle, such as the vehicle of FIG. 1A or the alternative vehicle of FIG. 1B. The oxygen sensor was cooled with a method consistent with the various embodiments disclosed herein.
Figure 9:
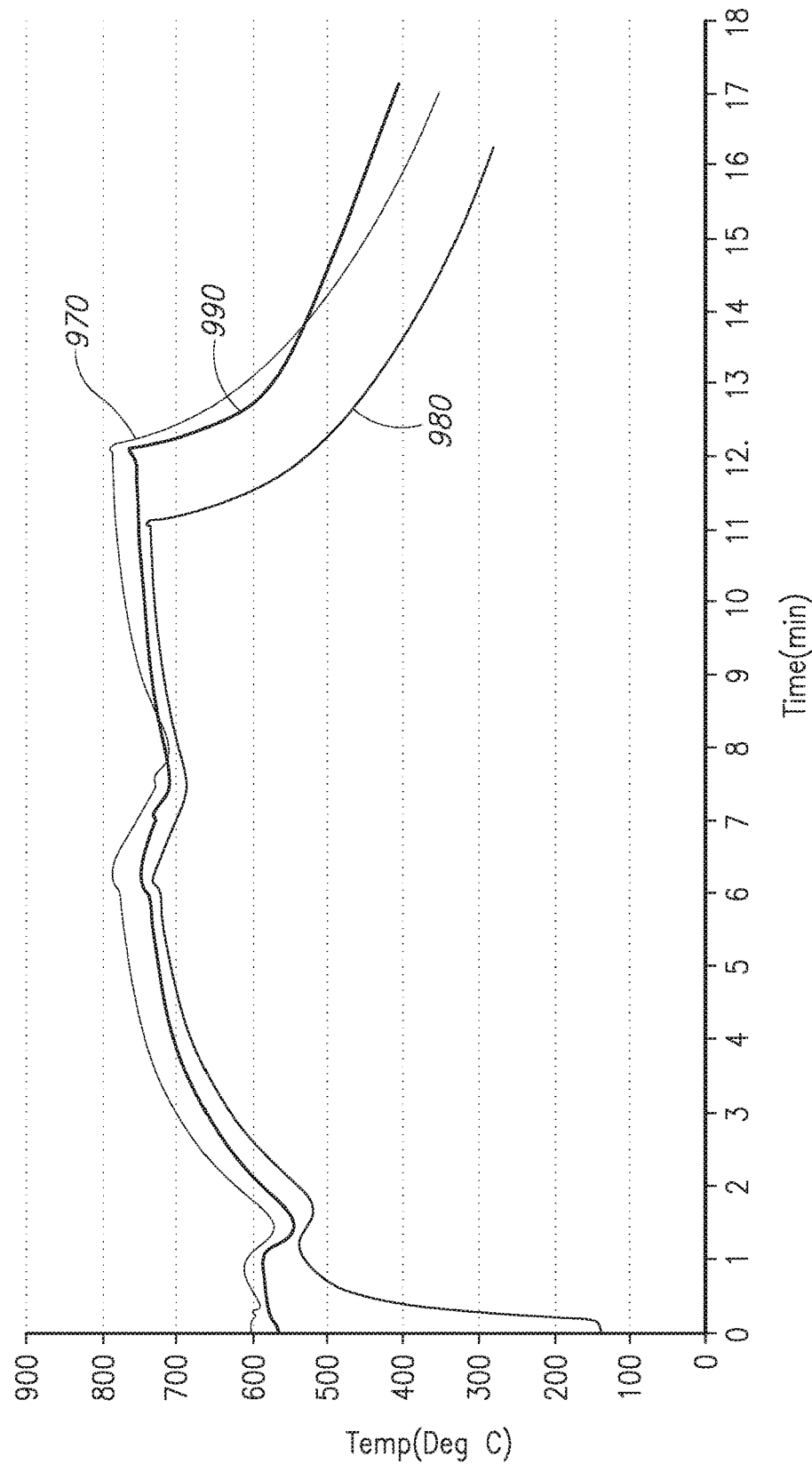
FIG. 9 illustrates temperature vs. time data for the sensing element/heater portion of an oxygen sensor, such as the oxygen sensor of FIG. 1C, that is thermally coupled to an exhaust system of a vehicle, such as the vehicle of FIG. 1A or the alternative vehicle of FIG. 1B. The oxygen sensor was cooled with a method consistent with the various embodiments disclosed herein.

FIG. 8 illustrates temperature time series data for the hex portion of an oxygen sensor, such as the oxygen sensor 100 of FIG. 1C, that is thermally coupled to an exhaust system of a vehicle, such as vehicle 10 of FIG. 1A or alternative vehicle 30 of FIG. 1B. The oxygen sensor was cooled with a method consistent with the various embodiments disclosed herein. Temperature data was acquired for 17 continuous minutes during the test sequence described above. The x-axis of the plot represents time in minutes and the y-axis of the plot represents temperature in degrees centigrade.

Curve 870 illustrates the hex portion temperature, as a function of time during the above test sequence, for the "original pipe" configuration. Curve 880 illustrates the hex portion temperature, as a function of time during the above test sequence, for the "new pipe" configuration. Curve 890 illustrates the hex portion temperature, as a function of time during the above test sequence, for the "new pipe and transmission exhaust duct" configuration.

FIG. 9 illustrates temperature time series data for the sensing element portion of an oxygen sensor, such as the oxygen sensor 100 of FIG. 1C, that is thermally coupled to an exhaust system of a vehicle, such as vehicle 10 of FIG. 1A or alternative vehicle 30 of FIG. 1B. The oxygen sensor was cooled with a method consistent with the various embodiments disclosed herein. Temperature data was acquired for 17 continuous minutes during the test sequence described above. The x-axis of the plot represents time in minutes and the y-axis of the plot represents temperature in degrees centigrade.

Curve 970 illustrates the sensing element portion temperature, as a function of time during the above test sequence, for the "original pipe" configuration. Curve 980 illustrates the sensing element portion temperature, as a function of time during the above test sequence, for the "new pipe" configuration. Curve 990 illustrates the sensing element portion temperature, as a function of time during the above test sequence, for the "new pipe and transmission exhaust duct" configuration. As shown in FIG. 2, the sensing element of the oxygen sensor is embedded within the engine's exhaust duct 210. Thus, the transmission exhaust is not directly incident on the sensing portion. Accordingly, the cooling due to transmission exhaust is less significant for the sensing portion, as compared to other portions of the oxygen sensor that are directly exposed to transmission exhaust.

All of the embodiments and methods disclosed and claimed herein can be made and executed without undue experimentation in light of the present disclosure. While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A vehicle comprising:
   one or more ground engaging members;
   an internal combustion engine having a combustion exhaust duct extending therefrom;
   an exhaust gas sensor coupled to the exhaust duct;
   a continuously variable transmission (CVT) having a drive clutch and a driven clutch, the CVT coupling the engine to the one or more ground engaging members, the CVT being housed in a transmission case having an inlet aperture and an outlet aperture, the CVT configured to draw air into the inlet aperture and output air from the outlet aperture when driven by the engine;
   a drivetrain duct that includes an inlet aperture and an outlet aperture, the drivetrain duct inlet aperture being coupled to the transmission case outlet aperture and the drivetrain duct outlet aperture being positioned adjacent the exhaust gas sensor such that air expelled from the CVT is directed towards the sensor.

2. The vehicle of claim 1, wherein the inlet aperture of the transmission case is disposed closer to the drive clutch than to the driven clutch, the outlet aperture of the transmission case being disposed closer to the driven clutch than to the drive clutch.

3. The vehicle of claim 1, having a forward end and a rearward end and wherein the driven clutch is disposed rearward of the drive clutch and rearward of the engine.

4. The vehicle of claim 1, further comprising a muffler secured to an outlet end of the combustion exhaust duct, wherein the combustion exhaust duct extends rearwardly of the engine to the muffler, the drivetrain duct being spaced below or to the side of the combustion exhaust duct.

5. The vehicle of claim 4, wherein the exhaust gas sensor is secured within a wall of the combustion exhaust duct between the engine and the muffler.

6. A vehicle comprising:
   one or more ground engaging members;
   an internal combustion engine having a combustion exhaust duct extending therefrom;
   an exhaust gas sensor coupled to the exhaust duct;
   a continuously variable transmission (CVT) having a drive clutch and a driven clutch, the CVT coupling the engine to the one or more ground engaging members, the CVT being housed in a housing having an inlet aperture and an outlet aperture, the CVT configured to draw air into the inlet aperture and expel air from the outlet aperture when driven by the engine;
   a drivetrain duct that includes an inlet aperture and an outlet aperture, the drivetrain duct inlet aperture being coupled to the transmission housing aperture and the drivetrain duct outlet aperture being positioned such that air expelled from the CVT is directed towards the sensor;

wherein the drivetrain duct inlet aperture is larger in cross-section than the drivetrain duct outlet aperture.

7. The vehicle of claim 6, the drivetrain duct having a length between the inlet aperture and the outlet aperture, wherein the drivetrain duct inlet aperture is larger in cross-section than at least a portion of the drivetrain duct.

8. The vehicle of claim 7, wherein the cross-sectional size of the drivetrain duct outlet aperture is smaller than the drivetrain duct inlet aperture cross-sectional size.

9. The vehicle of claim 6, wherein the outlet aperture of the transmission housing directs air in a first direction, while the outlet aperture of the drivetrain duct directs air in a second direction transverse to the first direction, the drivetrain duct having at least one bend.

10. The vehicle of claim 9, further comprising a mounting bracket coupling the drivetrain duct to a frame of the vehicle.

11. The vehicle of claim 6, wherein the drivetrain exhaust duct does not contact the combustion exhaust duct.

12. The vehicle of claim 11, wherein the drivetrain exhaust duct is positioned below and to the side of the combustion exhaust duct.

13. The vehicle of claim 6, further comprising a muffler secured to a downstream end of the exhaust gas duct, wherein the gas sensor is secured to the exhaust gas duct between the engine and the muffler.

14. The vehicle of claim 6, wherein the transmission housing inlet aperture is closer to the drive clutch than to the driven clutch.

15. The vehicle of claim 14, wherein the transmission housing outlet aperture is closer to the driven clutch than to the drive clutch, and wherein the driven clutch is rearward of the drive clutch and rearward of the engine.

* * * * *